(12) United States Patent
Abe et al.

(10) Patent No.: US 9,279,678 B2
(45) Date of Patent: Mar. 8, 2016

(54) PREPREG PASTING STATE INSPECTION APPARATUS

(71) Applicant: SANYO MACHINE WORKS, LTD., Aichi (JP)

(72) Inventors: Shoji Abe, Aichi (JP); Katsuo Tokida, Aichi (JP)

(73) Assignee: SANYO MACHINE WORKS, LTD., Aichi (JP)

( * ) Notice: Subject to any disclaimer, the term of this patent is extended or adjusted under 35 U.S.C. 154(b) by 486 days.

(21) Appl. No.: 13/746,413

(22) Filed: Jan. 22, 2013

(65) Prior Publication Data

US 2013/0194415 A1    Aug. 1, 2013

(30) Foreign Application Priority Data

Jan. 30, 2012 (JP) ................... 2012-016944

(51) Int. Cl.
  *G01C 11/02* (2006.01)
  *B29C 70/38* (2006.01)

(52) U.S. Cl.
  CPC .............. *G01C 11/02* (2013.01); *B29C 70/388* (2013.01)

(58) Field of Classification Search
  None
  See application file for complete search history.

(56) References Cited

U.S. PATENT DOCUMENTS

| 6,995,099 | B1 * | 2/2006 | Nishimura et al. ............. 442/59 |
| 2003/0145932 | A1 | 8/2003 | Holmes et al. |
| 2004/0060650 | A1 | 4/2004 | Holmes et al. |
| 2008/0204725 | A1 * | 8/2008 | Fujii et al. ........................ 356/73 |
| 2010/0058584 | A1 * | 3/2010 | Faraci et al. .................... 29/830 |
| 2011/0290421 | A1 | 12/2011 | Santos Gomez et al. |
| 2012/0147175 | A1 | 6/2012 | Kawaguchi et al. |

FOREIGN PATENT DOCUMENTS

| EP | 1 334 819 | 8/2003 |
| EP | 2 385 340 | 11/2011 |
| JP | 6-055656 | 3/1994 |
| JP | 2011-104905 | 6/2011 |
| WO | 2009/021038 | 2/2009 |

OTHER PUBLICATIONS

European Search Report dated May 3, 2013 in corresponding European Patent Application No. 13153052.9.

* cited by examiner

*Primary Examiner* — Justin Sanders
(74) *Attorney, Agent, or Firm* — Wenderoth, Lind & Ponack, L.L.P.

(57) ABSTRACT

Even when a pasting target body to which prepregs are pasted has a shape changed portion such as a curved portion, prepreg pasting states are accurately inspected. A prepreg pasting state inspection apparatus for inspecting a gap between adjacent prepregs on a pasting target body has a laser for emitting slit light along an inclined plane so that a projected pattern of the slit light is formed across the adjacent prepregs, a camera for imaging an irradiation region of the laser, and a control unit for determining whether the gap between the adjacent prepregs is within an allowance based on a signal from the camera. The apparatus also has a range sensor for measuring a distance between a reference position and the irradiation region, and focus adjusting units for adjusting focus positions of the camera and the laser based on the signal from the range sensor.

20 Claims, 5 Drawing Sheets

PREPREG PASTING STATE INSPECTION APPARATUS

TECHNICAL FIELD

The present invention relates to improvement in a technique for inspecting a prepreg pasting state.

BACKGROUND ART

As publicly known, laminated bodies of prepreg (for example, carbon prepreg) that are fired are used in fuselages of automobiles and airplanes.

The prepreg laminated bodies are constituted so that a plurality of prepregs is arranged in parallel on pasting target bodies by using a laminating apparatus. The pasting target bodies are usually molds or prepreg laminated bodies laminated on the molds.

However, even when prepregs are automatically pasted by the laminating apparatus, the defect in pasting of the prepregs is occasionally occurred. For this reason, as described in Patent Document 1, for example, in parallel with the pasting of the prepregs, states of gaps between adjacent prepregs are inspected.

Concretely, Patent Document 1 discloses that while light is being emitted obliquely to side ends (edge portions on sides where the gaps to be inspected are formed) of adjacent fiber-reinforced plastic tapes (corresponding to prepregs), the side ends are imaged by cameras, and distances between the edges are detected based on the obtained image data, and the states of the gaps are determined.

PRIOR ART DOCUMENT

Patent Document

Patent Document 1: JP 2011-104905 A

SUMMARY OF INVENTION

Technical Problems

However, in a case of the method disclosed in Patent Document 1, since edges of prepregs should be detected with it being irradiated directly with light, if gaps between the adjacent prepregs are narrowed, accuracy in detection of the gaps is deteriorated.

In order to solve such a problem, therefore, the following prepreg laminating apparatus is considered.

Concretely, as shown in FIGS. 1A to 1C, a laminating apparatus 1 is provided with a laminating head 11, and a pasting roller 12 that is integral with the laminating head 11. While the laminating head 11 is being moved along a pasting target body 3, prepregs 4 are sequentially pasted to the pasting target body 3 by the pasting roller 12.

As shown in FIG. 1C, the laminating apparatus 1 is provided with a pasting state inspection apparatus 2 having a laser 21 as an illumination unit and a camera 22 as an imaging unit. The laser 21 and the camera 22 move integrally with the laminating head 11. The inspection using the pasting state inspection apparatus 2 is carried out on a prepreg 4 which is being pasted and adjacent pasted prepreg 4. The inspection may be carried out on the adjacent prepreg 4 that has been pasted.

As shown in FIG. 2, the laser (the line laser) 21 emits slit light LA along an inclined plane so that a pattern X of the slit light LA are formed across the adjacent prepregs 4. In the case of FIG. 2, the projected pattern X is composed of projected lines L1 to L3. In such a manner, when a gap G is present between the prepregs 4, a level difference facing a longitudinal direction of the prepregs (pasting advancing direction) is formed between the projected lines L1 and L2 formed on the prepregs 4 and the projected line L3 formed on the pasting target body 3 corresponding to the gap G. The size of the level difference depends on a thickness of the prepregs 4 and an incident angle of the slit light LA. For this reason, when an irradiation region formed with the projected lines L1 to L3 is imaged by the camera 22 from above, image data shown in FIG. 3 can be obtained. A determination is made whether a distance A of the gap G detected based on the image data is within an allowance, so that the pasting states of the prepregs 4 can be accurately inspected. For example, when the gap distance A is within the allowance, the pasting of the prepregs 4 continues, and when not, the pasting of the prepregs 4 is suspended. Herein, it is preferable that the slit light LA is emitted so that the projected lines L1 to L3 are formed along a direction perpendicular to a longitudinal direction of the prepregs 4.

However, even such a pasting state inspection apparatus 2 has the following problem.

That is to say, the pasting target body 3 is composed of not only a plane portion 31 but often of a curved portion 32 according to a shape of a tail unit of an airplane or the like as shown in FIGS. 1A and 1B. When a shape changed portion such as the curved portion 32 is present, this causes an adverse effect on the imaging state of the camera 22, and thus the inspection accuracy in the pasting states of the prepregs 4 is deteriorated.

In view of the above circumstance, a technical problem of the present invention is to accurately inspect pasting states of prepregs even when a pasting target body to which prepregs are pasted has a shape changed portion such as a curved portion.

Solution To Problem

The present invention that is devised in order to solve the above problem is a prepreg pasting state inspection apparatus, for inspecting a gap between prepregs adjacent on a pasting target body having a shape changed portion, including an irradiation unit for emitting slit light along an inclined plane so that a projected pattern of the slit light is formed across the adjacent prepregs, an imaging unit for imaging an irradiation region of the irradiation unit, a determination unit for determining whether the gap between the adjacent prepregs is within an allowance based on a signal from the imaging unit, a distance measurement unit for measuring a distance between a reference position and the irradiation region, and a focus adjusting unit for adjusting a focus position of the imaging unit based on the signal from the distance measurement unit.

With such a constitution, the distance measurement unit measures a distance from the reference position to the irradiation region (for example, surfaces of the prepregs, or a surface of the pasting target body corresponding to the gap between the prepregs). For this reason, when the focus adjusting unit successively adjusts the focus position of the imaging unit, even if the shape changed portion is present in the pasting target body, the projected pattern formed across the adjacent prepregs can be accurately imaged and the gap between prepregs adjacent can be accurately detected. Therefore, the pasting states of the prepregs can be accurately inspected.

With the above embodiment, the imaging unit may have a movable lens that is capable of moving close to or separating from the irradiation region, and the focus adjusting unit may have a driving unit for moving the movable lens based on the signal from the distance measurement unit.

In such a manner, a focus position of the imaging unit can be easily adjusted according to movement of the movable lens. When the entire imaging unit is moved close to or is separated from the irradiation region, the focus position of the imaging unit may be adjusted.

In this case, it is preferable that the driving unit is an ultrasonic motor.

In such a manner, the focus position of the imaging unit can be adjusted finely and quickly. Further, the apparatus can be miniaturized.

It is preferable that the above constitution has a second focus adjusting unit for adjusting a focus position of the irradiation unit based on a signal from the distance measurement unit.

That is to say, when the shape changed portion is present in the pasting target body, this causes an adverse effect also on irradiation conditions of the irradiation unit (a width and lightness of the projected pattern fluctuate). For this reason, it is preferable that the focus position of the irradiation unit is adjusted like the above constitution.

In the above constitution, it is preferable that the irradiation unit is retained in a moving body that can move close to or separate from the irradiation region, and the second focus adjusting unit has a second driving unit for moving the moving body based on a signal from the distance measurement unit.

In this case, it is preferable that the second driving unit is an ultrasonic motor.

In such a manner, the focus position of the irradiation unit is adjusted finely and quickly, and the apparatus can be miniaturized.

It is preferable that the above constitution has a light amount adjusting unit for adjusting an amount of light incident on the imaging unit.

As a result, since the imaging unit can always observe an approximately same amount of light, so-called blown out highlights (overexposed state) can be prevented from occurring on data observed by the imaging unit due to an excessive amount of light. For this reason, the gap distance between the adjacent prepregs can be stably measured. Particularly, such a constitution is effective for the case where the shape changed portion is present in the pasting target body. This is because a direction of reflection light (for example, total reflection light) of light emitted from the irradiation unit changes on the shape changed portion, and the amount of light incident on the imaging unit is likely to fluctuate.

In the above constitution, it is preferable that the light amount adjusting unit is composed of at least one of an output adjusting unit for adjusting an output of the slit light emitted from the irradiation unit, a shutter speed adjusting unit for adjusting a shutter speed of the imaging unit, and an iris adjusting unit for adjusting an iris of the imaging unit.

That is to say, (1) when the output adjusting unit adjusts the output of the slit light, an amount of reflection light that causes an adverse effect on imaging can be adjusted. For this reason, when strong reflection light is predicted, the output of the slit light may be suppressed. (2) When the shutter speed of the imaging unit is adjusted by the shutter speed adjusting unit, time at which the light is incident on the imaging unit can be adjusted. For this reason, when strong reflection light is predicted, the shutter speed may be heightened. (3) When the iris of the imaging unit is adjusted by the iris adjusting unit, an amount of light indent on the imaging unit can be adjusted according to a narrowing-down level of the iris. For this reason, when the strong reflected light is predicted, the iris may be narrowed down. When any one of (1) to (3) is employed, the constitution can cope with a fluctuation in the amount of light incident on the imaging unit. However, (1) to (3) are suitably combined so that the constitution is compatible with the fluctuation in the amount of light more securely.

It is preferable that the above constitution is provided with a depth of field adjusting unit for adjusting a depth of field of the imaging unit.

As a result, imaging accuracy of the imaging unit can be prevented from being deteriorated on a position corresponding to the shape changed portion of the pasting target body. Examples of the depth of field adjusting unit include the iris of the imaging unit (for example, an electromotive iris), and a zoom mechanism (for example, electromotive zoom) if it is provided to the imaging unit. In this case, when the iris is narrowed down or the zoom mechanism is adjusted to a wide-angle side, the depth of field is deepened (deep-focus), thereby preventing the imaging accuracy of the imaging unit from being deteriorated on the shape changed portion.

Advantageous Effects of Invention

According to the present invention, even when the pasting target body to which the prepregs are pasted has the shape changed portion such as the curved portion, the pasting states of the prepregs can be accurately inspected.

DESCRIPTION OF EMBODIMENTS

Figure 1A:
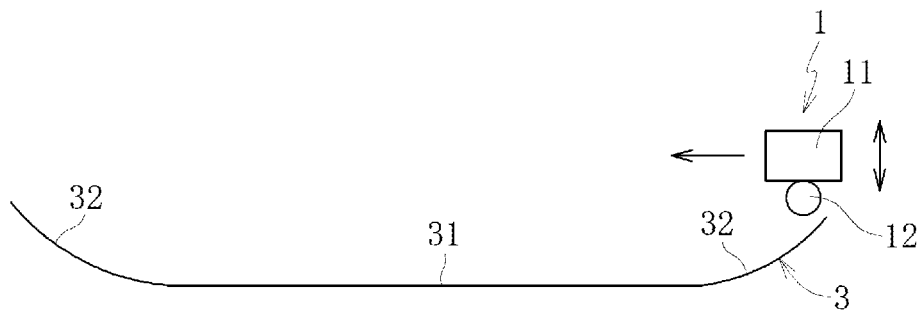
FIG. 1A is a conceptual diagram illustrating one example of a prepreg laminating apparatus.
Figure 1B:
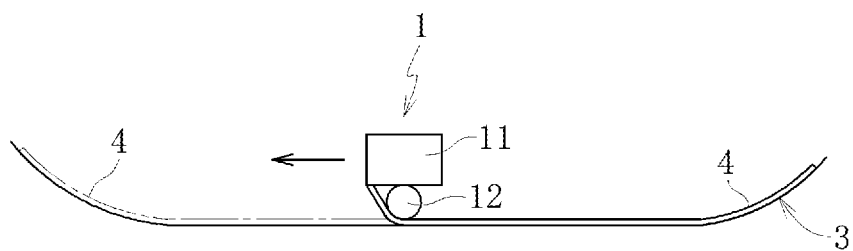
FIG. 1B is a conceptual diagram illustrating a condition of a prepreg pasting work using the laminating apparatus.
Figure 1C:
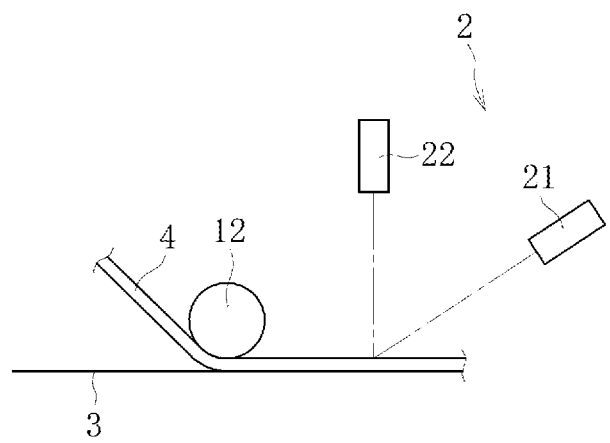
FIG. 1C is a conceptual diagram illustrating one example of a prepreg pasting state inspection apparatus mounted to the laminating apparatus.
Figure 2:
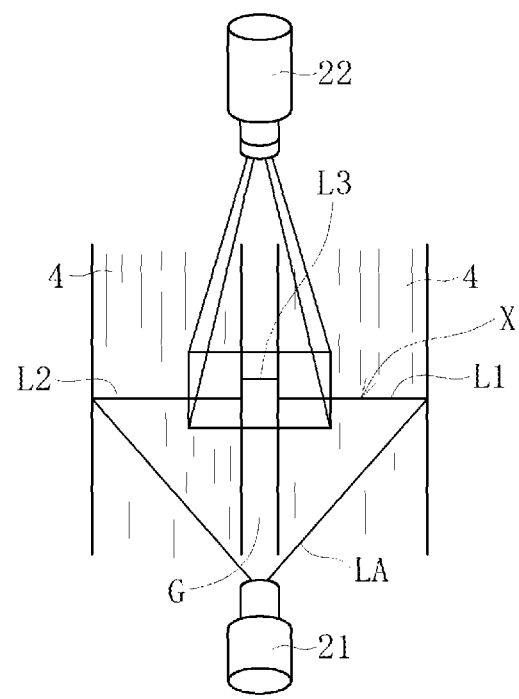
FIG. 2 is a conceptual diagram illustrating a condition of the inspecting work using the pasting state inspection apparatus shown in FIG. 1.
Figure 3:
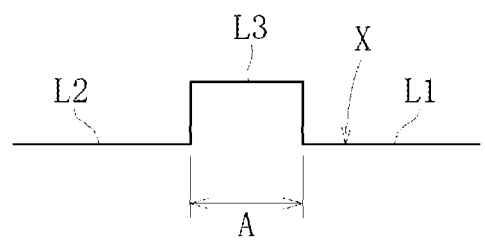
FIG. 3 is a conceptual diagram illustrating one example of image data captured by an imaging unit (a camera) in the condition of FIG. 2.

An embodiment of the present invention will be described below with reference to accompanying drawings. Since items relating to FIGS. 1 to 3 described already are similar, detailed description is omitted.

First Embodiment

Figure 4:
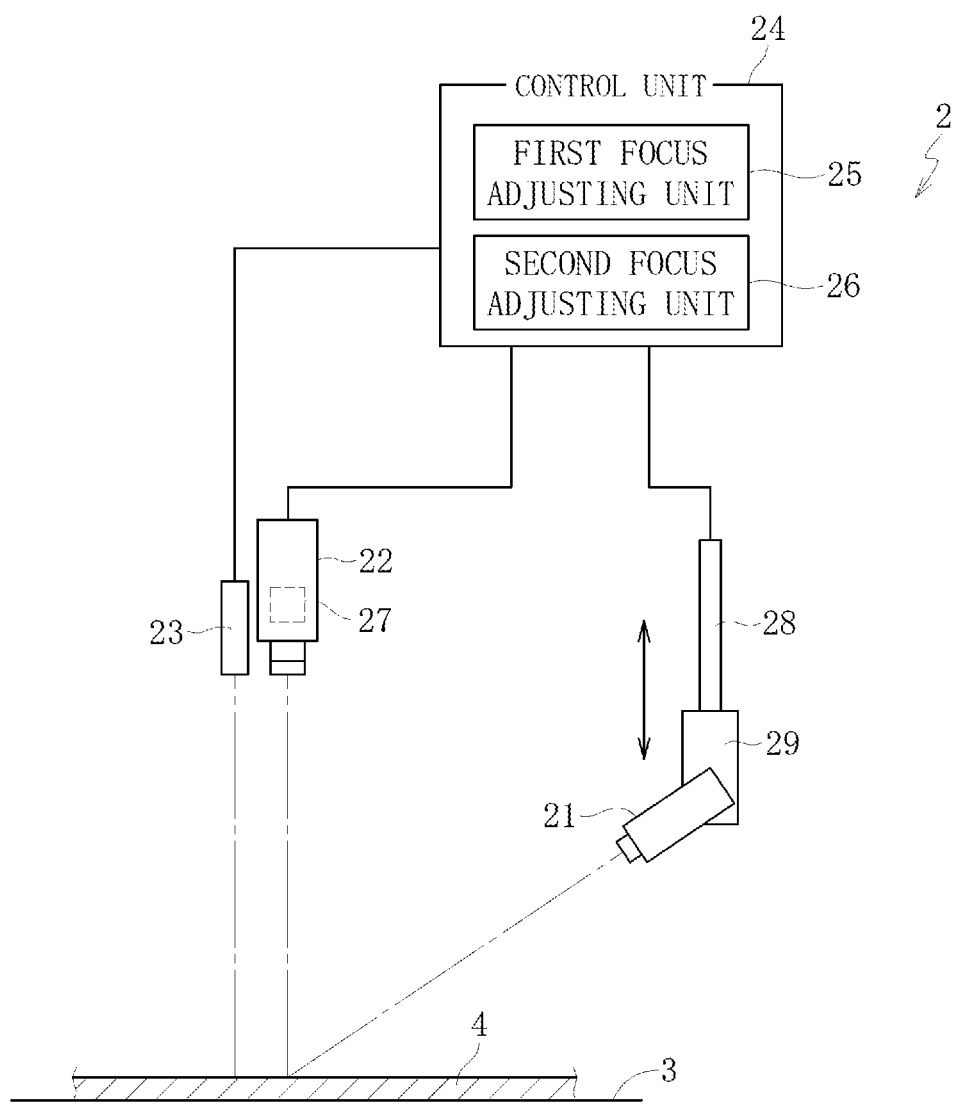
FIG. 4 is a conceptual diagram illustrating the prepreg pasting state inspection apparatus according to a first embodiment of the present invention.
Figure 5:
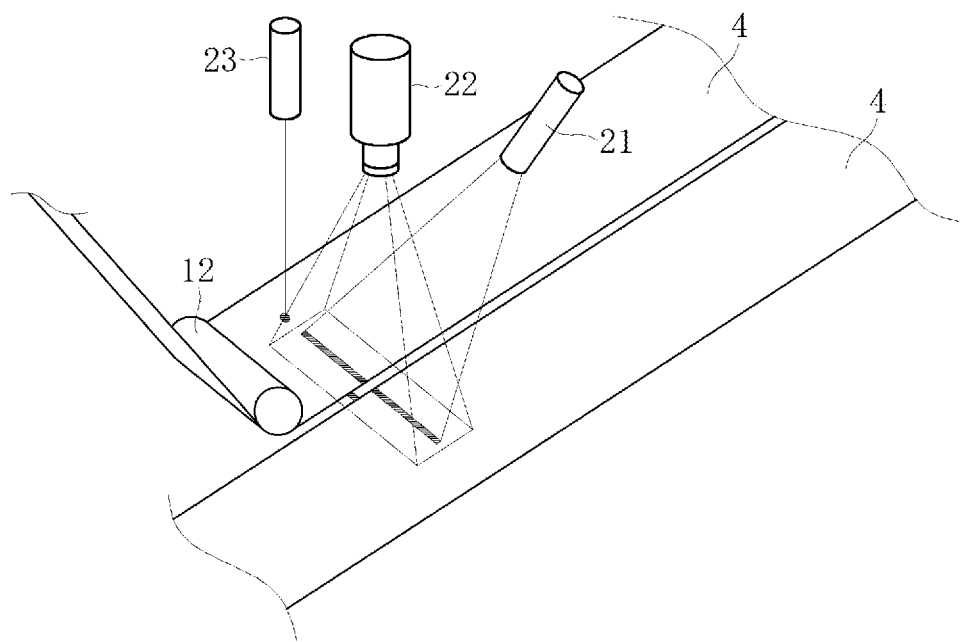
FIG. 5 is a perspective view illustrating the prepreg pasting state inspection apparatus according to the first embodiment of the present invention.

As shown in FIG. 4, a prepreg pasting state inspection apparatus 2 according to a first embodiment of the present invention is provided with a laser 21 as an irradiation unit, a camera 22 as an imaging unit for imaging an irradiation region of the laser 21, a control unit 24 as a determination unit for determining whether a gap S (gap distance A) between adjacent prepregs 4 is within an allowance based on a signal from the camera 22, and a range sensor 23 as a distance measurement unit for measuring a distance from a reference position to the irradiation region. The drawing, for convenience, illustrates the camera 22 and the range sensor 23 being adjacent to each other in a pasting advancing direction of the prepregs 4. Actually, however, both of them are arranged adjacently in a direction perpendicular to the pasting advancing direction of the prepregs 4, in other words, a widthwise direction of the prepregs 4 as shown in FIG. 5.

As the range sensor 23, a light wave type or sound wave type range sensor can be employed. A difference between the distance measured by the range sensor 23 and an actual distance from the camera 22 to the irradiation region is given in advance as a correction function. Similarly, a difference between the distance measured by the range sensor 23 and an actual distance from the laser 21 to the irradiation region is given in advance as a correction function. The irradiation unit is not limited to the laser 21, and thus illumination such as LED for emitting incoherent light can be employed.

The control unit 24 is provided with a first focus adjusting unit 25 for adjusting a focus position of the camera 22 based on a measurement signal from the range sensor 23, and a second focus adjusting unit 26 for adjusting a focus position of the laser 21 based on the measurement signal from the range sensor 23.

The camera 22 contains a motor (for example, an ultrasonic motor) 27 for moving a movable lens, not shown, back and forth with respect to an optical axis direction.

The laser 21 is mounted to a moving body 29 that moves up and down on a rail 28 extending to an up-down direction. The moving body 29 is driven by a motor, not shown (for example, an ultrasonic motor). The moving body 29 may be supported at a forward end of a cylinder expanding and contracting in the up-down direction.

The first focus adjusting unit 25 drives a motor 27 built in the camera 22 based on the distance measured signal input from the range sensor 23, and moves the movable lens of the camera 22 back and forth in the optical axis direction. As a result, the focus position of the camera 22 is automatically adjusted according to the distance measured signal from the range sensor 23.

On the other hand, a second focus adjusting unit 26 drives a motor connected to the moving body 29 based on the distance measured signal input from the range sensor 23 so as to move the laser 21 back and forth integrally with the moving body 29. As a result, the focus position of the laser 21 is automatically adjusted according to the distance measured signal from the range sensor 23.

Therefore, even when a shape changed portion such as a curved portion 32 is present in a pasting target body (the mold or a prepreg laminated body) 3, the focus positions of the laser 21 and the camera 22 are properly adjusted. For this reason, the image data shown in FIG. 3 can be securely obtained. Therefore, the pasting states of the prepregs 4 can be accurately inspected without being affected by the shape changed portion of the pasting target body 3.

Second Embodiment

The prepreg pasting state inspection apparatus 2 according to a second embodiment of the present invention is different from the first embodiment in that a light amount adjusting unit for adjusting an amount of light incident on the camera 22, and a depth of field adjusting unit for adjusting a depth of field of the camera 22 are provided. Only that different point will be described below.

The light amount adjusting unit is composed of at least one of an output adjusting unit for adjusting the output of the slit light emitted from the laser 21, a shutter speed adjusting unit for adjusting the shutter speed of the camera 22, and an iris adjusting unit for adjusting the iris of the camera. The light amount adjusting unit adjusts the amount of light incident on the camera 22 so that the amount of light becomes approximately constant.

The depth of field adjusting unit is composed of at least one of the iris adjusting unit for adjusting the iris of the camera, and a zoom adjusting unit for adjusting a zoom of the camera. Even if the shape of the pasting target body 3 changes, the depth of field adjusting unit adjusts the depth of field of the camera 22 so that the projected lines L1 to L3 can be clearly observed.

As a result, even when the curved portion 32 is present in the pasting target body 3, occurrence of defects such as blown out highlights and defocusing can be prevented. For this reason, the gap between the adjacent prepregs 4 can be accurately inspected.

The light amount adjusting unit and the depth of field adjusting unit change the adjusting amounts in the following manner, for example.

Figure 6A:
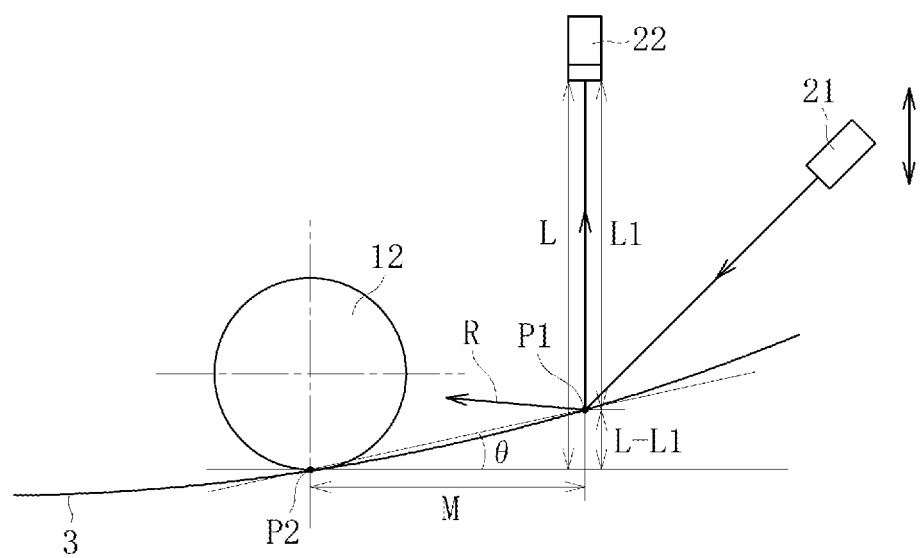
FIG. 6A is a diagram illustrating inspection conditions in an early state by means of the prepreg pasting state inspection apparatus according to a second embodiment of the present invention.
Figure 6B:
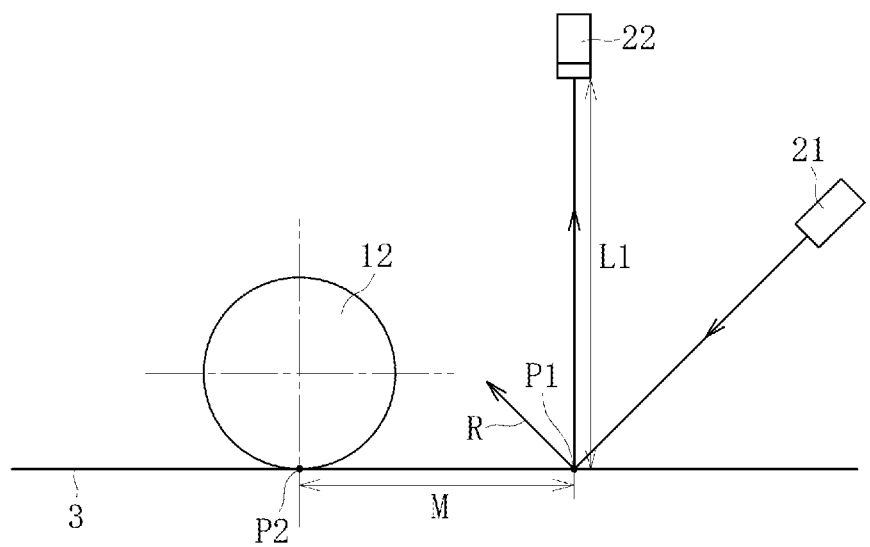
FIG. 6B is a diagram illustrating inspection conditions in a middle state by means of the prepreg pasting state inspection apparatus according to a second embodiment of the present invention.
Figure 6C:
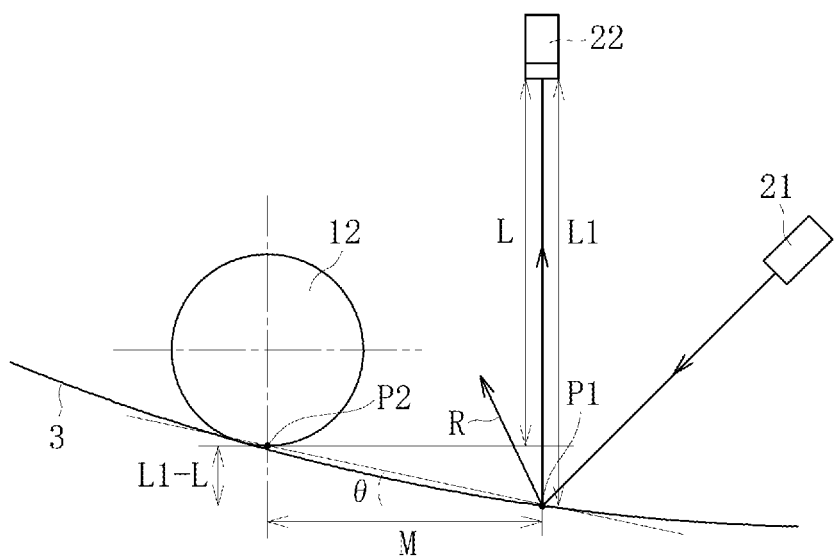
FIG. 6C is a diagram illustrating inspection conditions in a late state by means of the prepreg pasting state inspection apparatus according to a second embodiment of the present invention.

That is to say, as shown in FIGS. 6A to 6C, the adjusting amounts by means of the light amount adjusting unit and the depth of field adjusting unit are stored in advance according to a tilt angle θ of the pasting target body 3.

In the second embodiment, the tilt angle θ is set to an angle that is formed by a line segment P1P2 and a horizontal line. P1 is an intersection point between a perpendicular line drawn from the camera 22 and surface of the pasting target body 3 (or the prepregs 4). P2 is a lowest point on an outer periphery of the pasting roller 12. In the drawing, since a relative position relationship between the pasting roller 12 and the camera 22 does not change, M and L are known in advance. Further, L1 is successively detected based on the measured results of the range sensor 23. Therefore, the tilt angle θ is obtained according to the following formula;

$$\theta = \tan^{-1}((L-L1)/M) \tag{1}$$

In the case of FIG. 6B (the plane portion), since L1 is equal to L, θ becomes zero. On the other hand, in the case of FIG. 6A, since L-L1 is more than zero, θ obtains a positive value. In the case of FIG. 6C, since L-L1 is less than zero, θ obtains a negative value. A tilting direction of the pasting target body 3 can be determined based on the positive or negative value of θ.

While θ is being calculated in such a manner, the adjusting amounts of the light amount adjusting unit and the depth of field adjusting unit are changed according to a change in θ.

More concretely, in the case of FIG. 6A, since the slit light emitted from the laser 21 is incident on the surface of the pasting target body 3 (or the prepregs 4) at a shallow incident angle, reflection light R does not incident directly on the camera 22. In the case of FIG. 6B, the slit light emitted from the laser 21 is incident on the surface of the pasting target body 3 (or the prepregs 4) gradually at deeper incident angles, but the reflection light R is unlikely to be incident directly on the camera 22. On the contrary, in the case of FIG. 6C, since the slit light emitted from the laser 21 is incident on the surface of the pasting target body 3 (or the prepregs 4) at a deep incident angle, the reflection light R might be directly observed in the camera 22. For this reason, as shown in FIGS. 6A to 6C, as θ changes, the light amount adjusting unit narrows down the light amount and adjusts the amount of light so that it is approximately maintained in the same level in all the states of FIGS. 6A to 6C. On the other hand, the depth of field adjusting unit sets the depth of field as deep as possible so that the projected lines L1 to L3 (see FIG. 2) of the slit light can be clearly observed in the states of FIGS. 6A to 6C. In the second embodiment, the depth of field is constant in FIGS. 6A to 6C, but the depth of field may be changed according to the change in θ.

In practical use, it is occasionally requested to repeat the work for pasting the prepregs 4 to a plurality of pasting target bodies 3 belonging to the same kind at a speed of 1 m/s or more. In this case, when the adjusting amounts are tried to be changed by the light amount adjusting unit and the depth of field adjusting unit while θ is being calculated, it might be difficult to respond the request with for example, photographing of 30 frames/second (1 frame: 33 ms).

Therefore, in this case, when the work for pasting the prepregs 4 to one kind of the pasting target bodies 3 is repeated, the prepregs 4 are pasted to the first pasting target body 3 at a low speed of, for example, about 0.5 m/s (half of the normal pasting speed). A relationship between θ and the adjusting amounts by means of the light amount adjusting unit and the depth of field adjusting unit is stored (recording (teaching) step). As to the subsequent same kind of the pasting target bodies 3, the light amount adjusting unit and the depth of field adjusting unit are operated in the basis of the adjusting amounts stored in advance.

Since numerical value control (NC) data used for pasting the prepregs 4 to the pasting target body 3 is stored in a laminating apparatus 1, the NC data is used instead of θ so that the adjusting amounts of the light amount adjusting unit and the depth of field adjusting unit may be changed. That is to say, when three-dimensional data (or altitude data representing the surface) representing the surface of the pasting target body 3 is present, this may be used instead of θ.

The present invention is not limited to the above embodiments and can be carried out in various forms. For example, the first embodiment describes the case where the movable lens of the camera 22 is moved, but the entire camera 22 may be slid to the optical axis direction so that the focus position is adjusted.

The above embodiments describe the case where the pasting state inspection apparatus 2 is integral with the laminating apparatus 1, but they may be constituted separately.

EXPLANATIONS OF SYMBOLS 1 prepreg laminating apparatus
11 laminating head
12 pasting roller
2 prepreg pasting state inspection apparatus
21 laser
22 camera
23 range sensor
24 control unit
25 first focus adjusting unit (for a camera)
26 second focus adjusting unit (for a laser)
3 pasting target body
4 prepregs
X projected pattern
L1, L2, L3 projected line
LA slit light
S gap
A gap distance

The invention claimed is:

1. A prepreg pasting state inspection apparatus for inspecting a gap between adjacent prepregs on a pasting target body having a shape changed portion, the prepreg pasting state inspection apparatus comprising:
   an irradiation unit for emitting a line laser beam along an inclined plane so that a projected line of the line laser beam is formed across a longitudinal direction of the adjacent prepregs;
   an imaging unit for imaging an irradiation region of the irradiation unit;
   a determination unit for determining whether the gap between the adjacent prepregs is within an allowance based on a signal from the imaging unit;
   a distance measurement unit for measuring a distance between a reference position and the irradiation region; and
   a focus adjusting unit for adjusting a focus position of the imaging unit based on a signal from the distance measurement unit.

2. The prepreg pasting state inspection apparatus according to claim 1, wherein
   the imaging unit has a movable lens that is capable of moving close to or separating from the irradiation region, and
   the focus adjusting unit has a driving unit for moving the movable lens based on the signal from the distance measurement unit.

3. The prepreg pasting state inspection apparatus according to claim 1, further comprising a second focus adjusting unit for adjusting a focus position of the irradiation unit based on the signal from the distance measurement unit.

4. The prepreg pasting state inspection apparatus according to claim 3, further comprising a moving body in which
   the irradiation unit is retained, the moving body being capable of moving close to or separate from the irradiation region,
   wherein the second focus adjusting unit has a second driving unit for moving the moving body based on the signal from the distance measurement unit.

5. The prepreg pasting state inspection apparatus according to claim 1, further comprising a light amount adjusting unit for adjusting an amount of light incident on the imaging unit.

6. The prepreg pasting state inspection apparatus according to claim 5, wherein the light amount adjusting unit comprises at least one of an output adjusting unit for adjusting an output of the line laser beam emitted from the irradiation unit, a shutter speed adjusting unit for adjusting a shutter speed of the imaging unit, and an iris adjusting unit for adjusting an iris of the imaging unit.

7. The prepreg pasting state inspection apparatus according to claim 1, further comprising a depth of field adjusting unit for adjusting a depth of field of the imaging unit.

8. The prepreg pasting state inspection apparatus according to claim 2, further comprising a second focus adjusting unit for adjusting a focus position of the irradiation unit based on the signal from the distance measurement unit.

9. The prepreg pasting state inspection apparatus according to claim 8, further comprising a moving body in which
the irradiation unit is retained, the moving body being capable of moving close to or separate from the irradiation region,
wherein the second focus adjusting unit has a second driving unit for moving the moving body based on the signal from the distance measurement unit.

10. The prepreg pasting state inspection apparatus according to claim 2, further comprising a light amount adjusting unit for adjusting an amount of light incident on the imaging unit.

11. The prepreg pasting state inspection apparatus according to claim 3, further comprising a light amount adjusting unit for adjusting an amount of light incident on the imaging unit.

12. The prepreg pasting state inspection apparatus according to claim 4, further comprising a light amount adjusting unit for adjusting an amount of light incident on the imaging unit.

13. The prepreg pasting state inspection apparatus according to claim 10, wherein the light amount adjusting unit comprises at least one of an output adjusting unit for adjusting an output of the line laser beam emitted from the irradiation unit, a shutter speed adjusting unit for adjusting a shutter speed of the imaging unit, and an iris adjusting unit for adjusting an iris of the imaging unit.

14. The prepreg pasting state inspection apparatus according to claim 11, wherein the light amount adjusting unit comprises at least one of an output adjusting unit for adjusting an output of the line laser beam emitted from the irradiation unit, a shutter speed adjusting unit for adjusting a shutter speed of the imaging unit, and an iris adjusting unit for adjusting an iris of the imaging unit.

15. The prepreg pasting state inspection apparatus according to claim 12, wherein the light amount adjusting unit comprises at least one of an output adjusting unit for adjusting an output of the line laser beam slit light emitted from the irradiation unit, a shutter speed adjusting unit for adjusting a shutter speed of the imaging unit, and an iris adjusting unit for adjusting an iris of the imaging unit.

16. The prepreg pasting state inspection apparatus according to claim 2, further comprising a depth of field adjusting unit for adjusting a depth of field of the imaging unit.

17. The prepreg pasting state inspection apparatus according to claim 3, further comprising a depth of field adjusting unit for adjusting a depth of field of the imaging unit.

18. The prepreg pasting state inspection apparatus according to claim 4, further comprising a depth of field adjusting unit for adjusting a depth of field of the imaging unit.

19. The prepreg pasting state inspection apparatus according to claim 5, further comprising a depth of field adjusting unit for adjusting a depth of field of the imaging unit.

20. The prepreg pasting state inspection apparatus according to claim 6, further comprising a depth of field adjusting unit for adjusting a depth of field of the imaging unit.

* * * * *